UNITED STATES PATENT OFFICE.

HEINRICH GRÜNHAGEN, OF BERLIN-KARLSHORST, GERMANY, ASSIGNOR TO ACTIEN GESELLSCHAFT FÜR ANILIN FABRIKATION, OF BERLIN, GERMANY.

DYES OF THE BENZENE-NAPHTHALENE SERIES AND PROCESS FOR THEIR MANUFACTURE.

1,255,740.      Specification of Letters Patent.      Patented Feb. 5, 1918.

No Drawing.      Application filed July 29, 1916. Serial No. 112,198.

*To all whom it may concern:*

Be it known that I, HEINRICH GRÜNHAGEN, a citizen of the Empire of Germany, residing at Berlin-Karlshorst, Germany, my P. O. address being Prinz Joachimstr. 13, Berlin-Karlshorst, Germany, have invented certain new and useful Improvements in Dyes of the Benzene-Naphthalene Series and Processes for Their Manufacture, of which the following is a specification.

In a co-pending application, serially numbered 112197 I have described and claimed new dyes of the benzene-naphthalene acridin series of the general graphic formula:

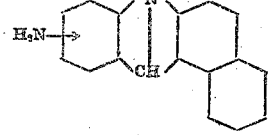

Now my present application is to cover and claim new dyes of the benzene-naphthalene acridin series as represented by the general graphic formula:

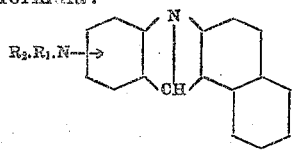

in which formula $R_1$ and $R_2$ mean univalent substituents, and more especially an H atom or an alkyl group.

As typical examples of these new dyes the two following may be given:

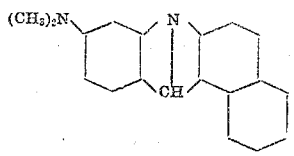

and

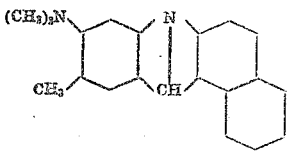

My new and improved process for their manufacture consists in heating a formyl derivative of a beta-naphthylamin with a salt of a meta-diamin of the benzene series. For instance if making use of a salt of meta-aminodimethylanilin or of a salt of 4-amino-2-dimethylaminotoluene and on the other side of formyl-beta-naphthylamin the reaction follows the two equations hereafter:

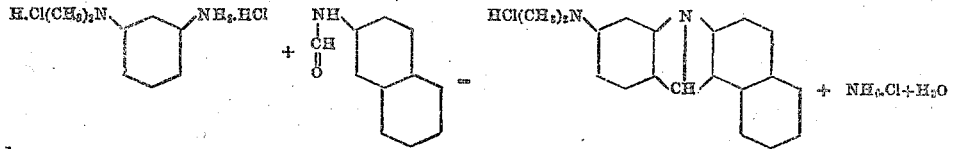

and

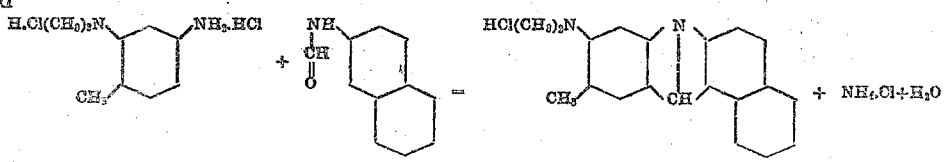

These N-dialkylated benzene-naphthalene acridin dyes may also be obtained by my new process in the reversed form, in heating, for instance, a formyl-derivative of a meta-amino-dimethylanilin with a salt of a betanaphthylamin or by heating a formyl derivative of a 4-amino-2-diallylaminotoluene with a salt of a beta-naphthylamin.

The new process is then represented by the two equations:

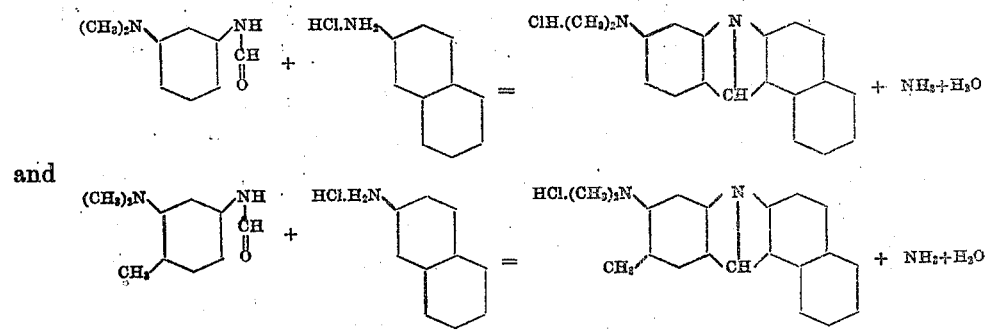

The following examples serve to illustrate my invention, the parts being by weight:

(1). 17.1 parts of formyl-2-naphthylamin and 20.9 parts of 3-aminodimethylanilin-hydrochlorid are melted together in an enameled iron vessel provided with an agitator and an oil bath; the temperature is gradually raised to 160–190° C. The reaction is finished if the evolution of water vapors has ceased. The melt is then dissolved in boiling water, the solution filtered while hot and the dye precipitated from the filtrate by adding a solution of common salt and of zinc-chlorid.

The new dye thus obtained forms a brown red powder; it dyes leather clear and deep orange tints.

(2). According to the indications given in Example 1 one melts together 17.1 parts of formyl-2-naphthylamin and 21 parts of 4-amino-2-methylaminotoluene-hydrochlorid. The melt may be worked up as given above; the new dye thus obtained forms in the dry state and pulverized a red brown powder dyeing leather clear and deep orange yellow tints.

(3). 17.1 parts of formyl-2-naphthylamin and 22.5 parts of 4-amino-2-dimethylaminotoluene-hydrochlorid are melted together raising the temperature gradually to 180 to 190° C. The new dye is separated from the melt according to the indications given above; it forms in the dry state when pulverized a red-brown powder, easily soluble in water. The new dye produces on leather clear and deep orange yellow tints.

(4). 16.5 parts of formyl-meta-aminodimethylanilin and 17.9 parts of beta-naphthylamin-hydrochlorid are heated together taking care to follow the general conditions given in the above examples; in working up the melt as above indicated some hydrochloric acid may be added.

The dye thus obtained is essentially the same as the product obtained according to Example 1.

(5). 17.8 parts of 4-formylamino-2-dimethylaminotoluene and 17.9 parts of beta-naphthylamin-hydrochlorid are melted together at about 170–190° C.; as to the general conditions of reaction compare above. In working up the melt it may be preferable to add some hydrochloric acid. The dye thus obtained is essentially the same as the product obtained according to Example 3.

My present invention is not limited to the foregoing examples or to the details and special conditions of reaction given therein. Thus for instance instead of beta-naphthylamin itself a suitable chloro- or bromo-derivative thereof may be used. Other suitable salts than the hydrochlorids, for instance sulfates, may be employed.

Having now described my invention what I claim is;—

1. As a new process for the manufacture of new dyes of the acridin series the process which consists in heating a formyl derivative of a beta-naphthylamin with a salt of a meta-diamin of the benzene series.

2. As a new process for the manufacture of new dyes of the acridin series the process which consists in heating a formyl derivative of a beta-naphthylamin with a salt of an alkylated meta-diamin of the benzene series.

3. As a new process for the manufacture of new dyes of the acridin series the process which consists in heating a formyl derivative of a beta-naphthylamin with a sale of an N-alkylated meta-diamin of the benzene series.

4. As a new process for the manufacture of new dyes of the acridin series the process which consists in heating a formyl derivative of a beta-naphthylamin with a salt of a C- and N-alkylated meta-diamin of the benzene series.

5. As a new process for the manufacture of a new dye of the acridin series the process which consists in heating formyl-beta-naphthylamin with a salt of a meta-aminodimethyl derivative of a monamin of the benzene series.

6. As a new process for the manufacture of a new dye of the acridin series the process which consists in heating formyl-beta-naphthylamin with 4-amino-2-dimethyl-amino toluene-hydrochlorid.

7. As new articles of manufacture new dyes of the acridin series the underlying general graphic formula of which corresponds to the formula:

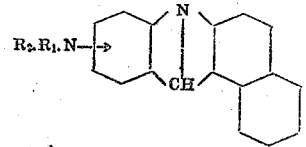

in which formula $R_1$ and $R_2$ mean univalent substituents.

8. As a new article of manufacture the new dye of the acridin series corresponding to the formula:

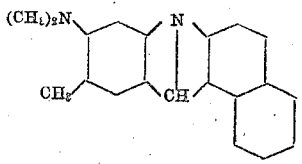

which dye in the dry state and pulverized forms a red brown powder dyeing leather clear and deep orange yellow tints.

In testimony whereof I have affixed my signature in presence of two witnesses.

HEINRICH GRÜNHAGEN.

Witnesses:
HENRY HASPER,
ALLEN F. JENNINGS.